United States Patent
Koura

(10) Patent No.: US 10,082,619 B2
(45) Date of Patent: Sep. 25, 2018

(54) DISPLAY DEVICE

(71) Applicant: Japan Display Inc., Tokyo (JP)

(72) Inventor: Shinji Koura, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/432,243

(22) Filed: Feb. 14, 2017

(65) Prior Publication Data

US 2017/0248751 A1    Aug. 31, 2017

(30) Foreign Application Priority Data

Feb. 26, 2016  (JP) ................ 2016-036392

(51) Int. Cl.
| | |
|---|---|
| *F21V 8/00* | (2006.01) |
| *H02J 50/12* | (2016.01) |
| *G02F 1/13357* | (2006.01) |
| *G02F 1/1335* | (2006.01) |
| *G02F 1/1339* | (2006.01) |
| *G09G 3/34* | (2006.01) |
| *G09G 3/36* | (2006.01) |

(52) U.S. Cl.
CPC .......... *G02B 6/0083* (2013.01); *G02B 6/005* (2013.01); *G02B 6/009* (2013.01); *G02B 6/0051* (2013.01); *G02B 6/0055* (2013.01); *G02B 6/0056* (2013.01); *G02F 1/1336* (2013.01); *G09G 3/342* (2013.01); *H02J 50/12* (2016.02); *G02F 1/13394* (2013.01); *G02F 1/133528* (2013.01); *G02F 2001/133612* (2013.01); *G09G 3/3413* (2013.01); *G09G 3/3648* (2013.01)

(58) Field of Classification Search
CPC .. G02B 6/0083; G02B 6/0051; G02B 6/0055; G02B 6/0056; G02B 6/009; G02B 6/005; G02F 1/1336; G02F 2001/133612; G02F 1/133528; G02F 1/13394; G09G 3/342; G09G 3/3648; G09G 3/3413; H02J 50/12
USPC ...................... 362/615, 97.1, 97.2
See application file for complete search history.

(56) References Cited

U.S. PATENT DOCUMENTS

| | | | |
|---|---|---|---|
| 2008/0043178 A1* | 2/2008 | Yoshihara | G09G 3/3406 349/99 |
| 2014/0035385 A1* | 2/2014 | Hatanaka | H02J 5/005 307/104 |
| 2014/0226108 A1* | 8/2014 | Itakura | G02B 6/0021 349/65 |
| 2014/0232969 A1 | 8/2014 | Tsubaki et al. | |

(Continued)

FOREIGN PATENT DOCUMENTS

| | | |
|---|---|---|
| JP | 2014-160218 A | 9/2014 |
| JP | 2015090464 A * | 5/2015 |

(Continued)

OTHER PUBLICATIONS

Machine English Translation of JP2015090464A (May 11, 2015).*
Machine English Translation of JP2016208793A (Dec. 8, 2016).*

*Primary Examiner* — Anh Mai
*Assistant Examiner* — Glenn Zimmerman
(74) *Attorney, Agent, or Firm* — K&L Gates LLP

(57) ABSTRACT

According to an aspect, a display device includes: a display unit; a light source device that irradiates the display unit with light, and that includes a plurality of luminous bodies; at least one power reception unit that receives power for the light source device; and at least one power transmission unit that wirelessly transmits power to the power reception unit.

7 Claims, 20 Drawing Sheets

(56) References Cited

U.S. PATENT DOCUMENTS

| | | | | |
|---|---|---|---|---|
| 2014/0302782 A1* | 10/2014 | Raab | ................... | H04B 5/0037 |
| | | | | 455/41.1 |
| 2014/0340875 A1* | 11/2014 | Hayashi | ............ | G02F 1/133308 |
| | | | | 362/97.1 |
| 2016/0210899 A1* | 7/2016 | Hyun | ................... | G09G 3/3258 |

FOREIGN PATENT DOCUMENTS

| | | | |
|---|---|---|---|
| JP | 2016208793 A * | 12/2016 | |
| WO | WO 2012169797 A2 * | 12/2012 | ............. G06F 3/041 |

\* cited by examiner

DISPLAY DEVICE

CROSS-REFERENCE TO RELATED APPLICATIONS

This application claims priority from Japanese Application No. 2016-036392, filed on Feb. 26, 2016, the contents of which are incorporated by reference herein in its entirety.

BACKGROUND

1. Technical Field

The present invention relates to a display device.

2. Description of the Related Art

Japanese Patent Application Laid-open Publication No. 2014-160218 discloses a display device coupled to a flexible substrate. Display control signal wiring and power wiring for a light source are routed on the flexible substrate. Image information is input from the outside as a display control signal through the display control signal wiring so that a display operation is controlled, and power for a light source for emitting light from a panel unit of the display device to an observer side is supplied from the outside through the power wiring for a light source. The power wiring for a light source is thicker than the display control signal wiring, and thus the flexible substrate includes a first flexible substrate including the power wiring for a light source and a second flexible substrate including the display control signal wiring. This configuration gives greater flexibility in routing of the wiring on the second flexible substrate, on which a lot of lines for the display control signal wiring have to be arranged.

However, the width of the first flexible substrate is narrower than the width of the second flexible substrate, and thus it is required to lower a possibility of disconnection due to vibration.

An object of the present invention is to provide a display device in which the disconnection of power wiring due to vibration does not occur.

SUMMARY

According to an aspect, a display device includes: a display unit; a light source device that irradiates the display unit with light, and that includes a plurality of luminous bodies; at least one power reception unit that receives power for the light source device; and at least one power transmission unit that wirelessly transmits power to the power reception unit.

According to another aspect, a display device includes: a display unit that emits light by a self-luminous body; at least one power reception unit that receives power for the self-luminous body; and at least one power transmission unit that wirelessly transmits power to the power reception unit.

DETAILED DESCRIPTION

Figure 1:
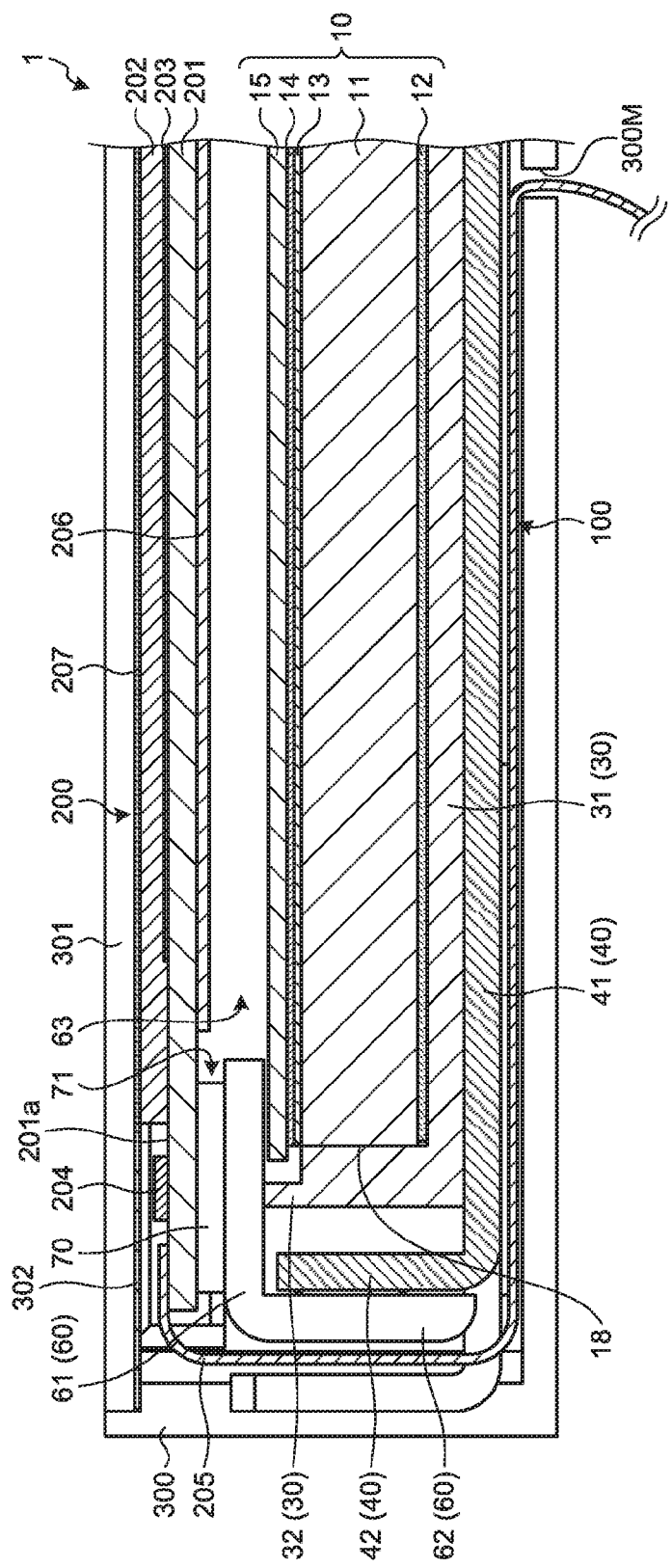
FIG. 1 is a sectional view of a display device according to a first embodiment of the present invention.

Modes (embodiments) for carrying out the present invention will be described in detail with reference to the drawings. The contents described in the embodiments are not intended to limit the present invention. Components described below include components easily conceivable by those skilled in the art and components substantially identical therewith. Furthermore, the components described below can be appropriately combined. The disclosure is given by way of example only, and various changes made without departing from the spirit of the invention and easily conceivable by those skilled in the art naturally fall within the scope of the invention. The drawings may possibly illustrate the width, the thickness, the shape, and other elements of each unit more schematically than the actual aspect to simplify the explanation. These elements, however, are given by way of example only and are not intended to limit interpretation of the invention. In the specification and the figures, components similar to those previously described with reference to a preceding figure are denoted by like reference numerals, and overlapping explanation thereof will be appropriately omitted.

First Embodiment

Figure 2:
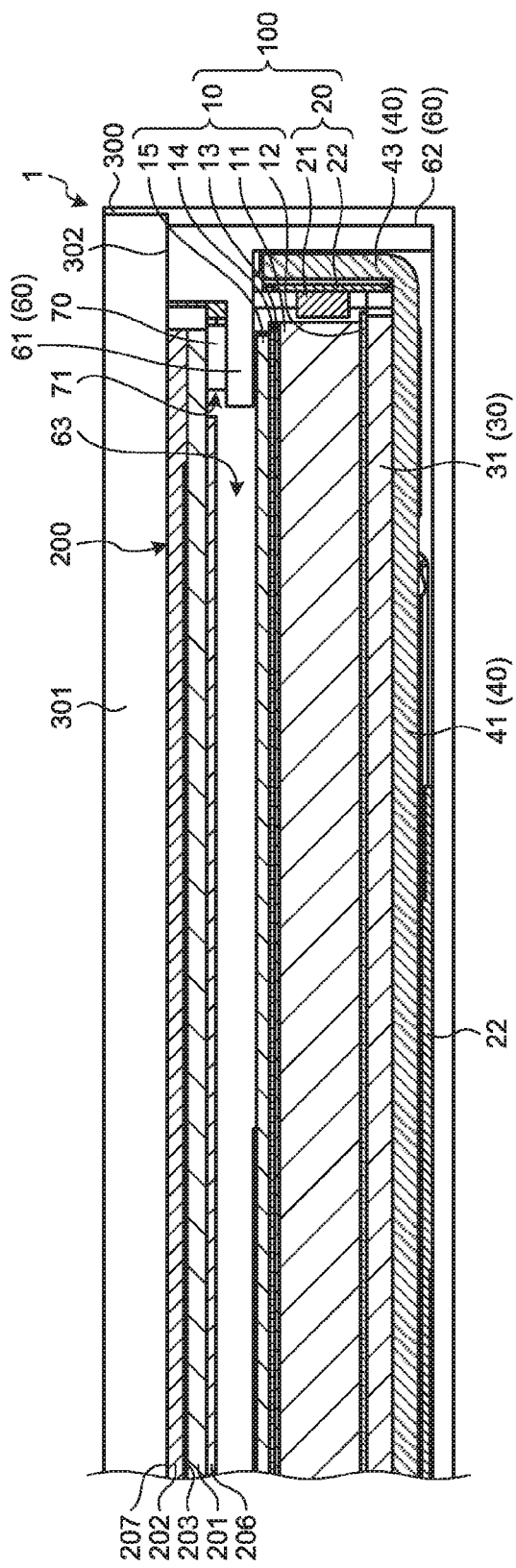
FIG. 2 is a sectional view of the display device according to the first embodiment.
Figure 3:
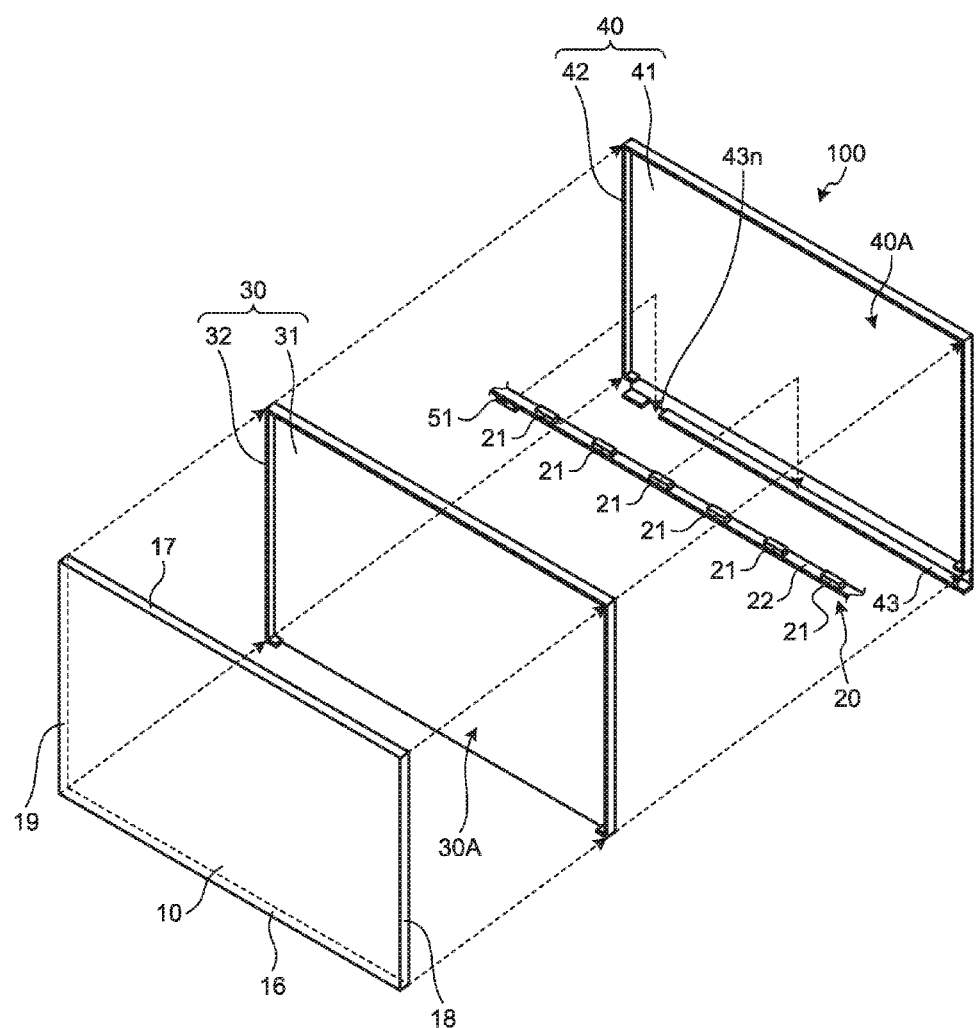
FIG. 3 is an exploded perspective view of a light source device.
Figure 4:
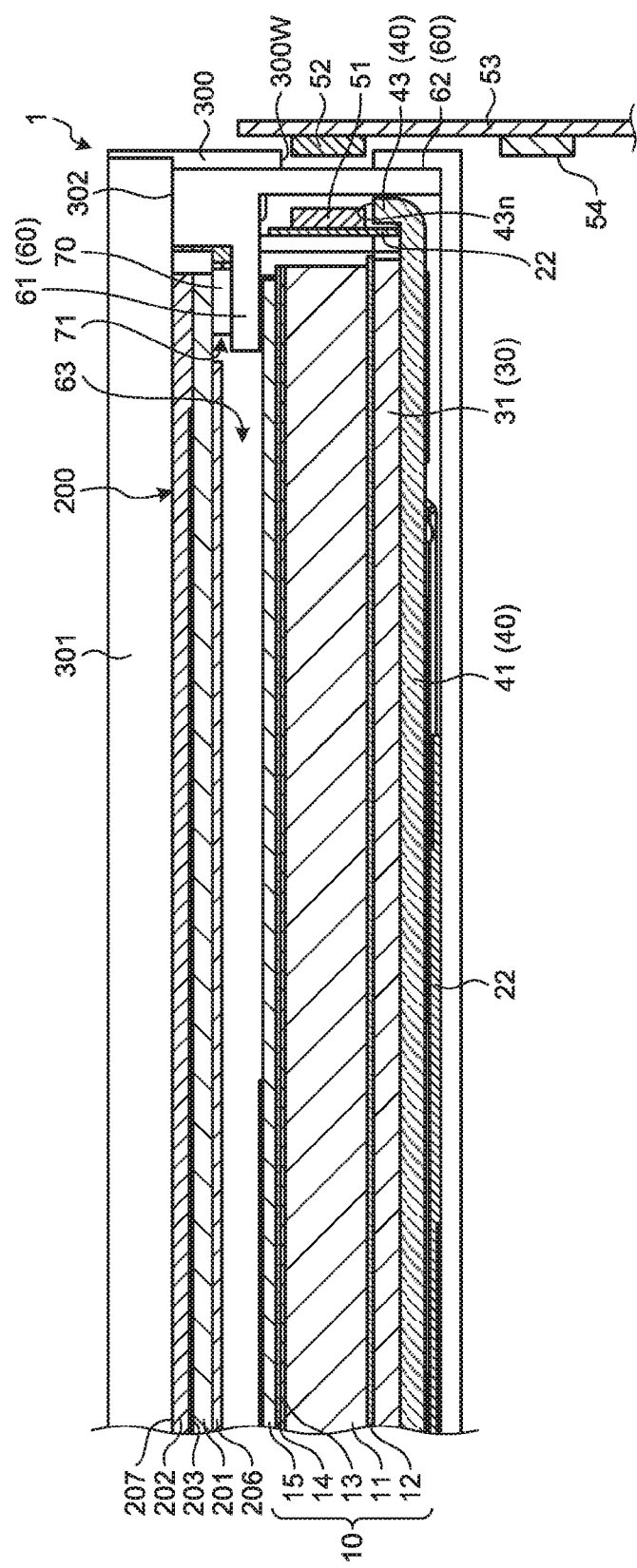
FIG. 4 is a sectional view of the display device according to the first embodiment.
Figure 5:
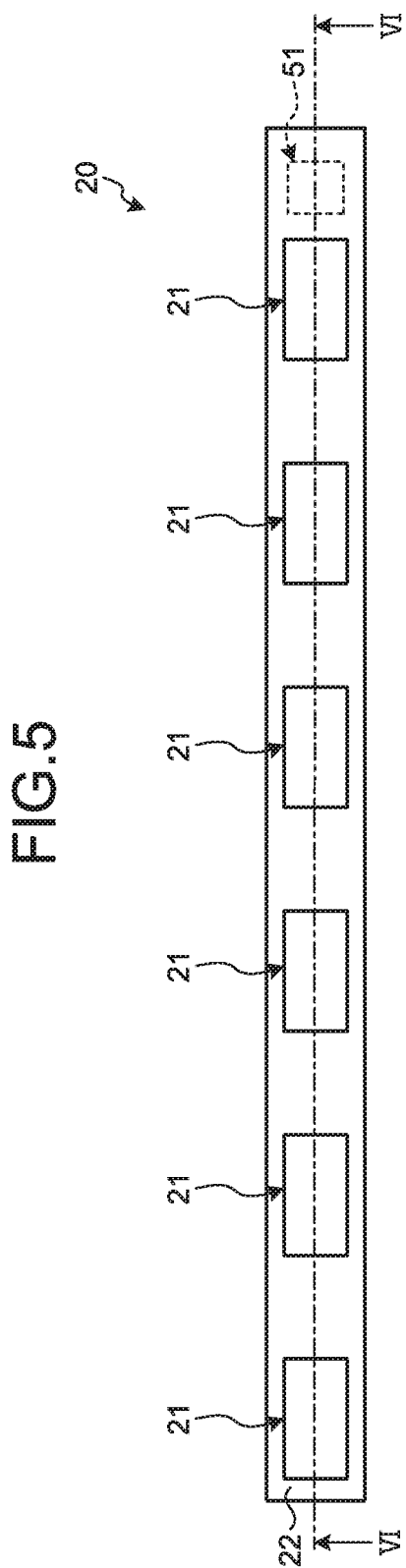
FIG. 5 is a plan view of a light source of the display device according to the first embodiment.
Figure 6:
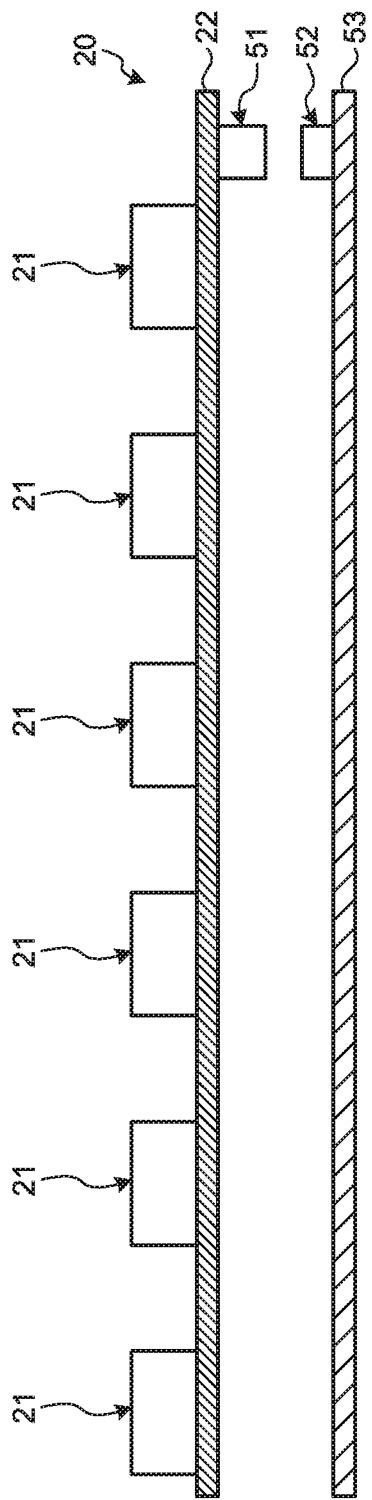
FIG. 6 is a sectional view illustrating a cross-section taken along line VI-VI in FIG. 5.

FIG. 1, FIG. 2, and FIG. 4 are sectional views of a display device according to a first embodiment of the present invention. FIG. 3 is an exploded perspective view of a light source device. FIG. 5 is a plan view of a light source of the display device according to the first embodiment. FIG. 6 is a sectional view illustrating a cross-section taken along line VI-VI in FIG. 5.

A display device 1, for example, includes a light source device 100, a display panel (a display unit) 200, and a housing 300. The light source device 100 irradiates the display panel 200 with light. The display device 1, for example, modulates light emitted from the light source device 100 by the display panel 200, and displays an image. FIG. 1 is a sectional view illustrating an end portion of the display panel 200 on a side where a terminal portion 201a is disposed. FIG. 2 is a sectional view illustrating an end portion on a side where a light source 20 is disposed. FIG. 4 is a sectional view illustrating a periphery where a power reception unit 51 is disposed.

In the following description, the arrangement of each member will be described assuming a direction from the light source device 100 towards the display panel 200 as "upper", a direction from the display panel 200 towards the light source device 100 as "lower", and a horizontal direction orthogonal to a vertical direction as "lateral".

The light source device 100 includes a light guide body 10, the light source 20, an inner frame 30, a back cover 40, and a front cover 60. An upper portion of each of the light guide body 10 and the inner frame 30 is covered with an upper surface cover portion 61 of the front cover 60 in a state where each of the light guide body 10 and the inner frame 30 is fixed to the back cover 40. The back cover 40 is fitted into the front cover 60 in a state where an outside surface of a second frame body 42 and an outside surface of a light source holding unit 43 are disposed along a side surface cover portion 62 of the front cover 60. An air gap 63 through which light emitted from the light guide body 10 towards the display panel 200 is transmitted is provided in the upper surface cover portion 61.

The display panel 200 is disposed on the upper surface cover portion 61 via a spacer 70. The display panel 200, for example, includes a first substrate 201, a second substrate 202, a liquid crystal layer 203, a first polarizing layer 206, a second polarizing layer 207, a display control circuit 204, and a flexible printed circuit (FPC) board 205. The first substrate 201 and the second substrate 202 are disposed to face each other with the liquid crystal layer 203 interposed therebetween. The first polarizing layer 206 is disposed on a lower surface of the first substrate 201. The second polarizing layer 207 is disposed on an upper surface of the second substrate 202.

In the spacer 70, a penetrating portion 71 that penetrates through the spacer 70 from the light source device 100 side towards the display panel 200 side is disposed at a position facing the air gap 63. The first polarizing layer 206 is housed inside the penetrating portion 71. A dimension in a plan view of the penetrating portion 71 is larger than that of the first polarizing layer 206. The thickness of the penetrating portion 71 is larger than the thickness of the first polarizing layer 206.

The first substrate 201 includes the terminal portion 201a protruding toward the outside of the second substrate 202. The display control circuit 204 and the FPC board 205 are mounted on the terminal portion 201a. An end portion of the FPC board 205 is drawn to a lower surface side of the back cover 40 along the side surface cover portion 62. In the display control circuit 204, an image signal is input from the outside through the FPC board 205. The display control circuit 204 controls the orientation (a modulation amount) of liquid crystals of the liquid crystal layer 203 based on the image signal. The light emitted from the light guide body 10 is transmitted through the first polarizing layer 206, is incident on the liquid crystal layer 203, and is modulated by the liquid crystal layer 203. The light modulated by the liquid crystal layer 203 is transmitted through the second polarizing layer 207, and is recognized as an image.

The light source device 100 and the display panel 200 are housed inside the housing 300. In the housing 300, cover glass 301 transmitting the light that has been transmitted through the second polarizing layer 207 to the outside of the housing 300 is disposed. In a frame region disposed around the cover glass 301, a light shielding unit 302 having light transmittance lower than that of the cover glass 301 is disposed. The FPC board 205 is drawn from an opening portion 300M disposed in the housing 300 to the outside of the housing 300 through a gap between the back cover 40 and the housing 300. The cover glass 301 may be a light transmissive base material, and examples thereof include, but are not limited to, glass and a transparent resin plate material.

The light guide body 10 is a plate-like member including a light guide plate. The light guide body 10, for example, has a rectangular shape. As illustrated in FIG. 1, the light guide body 10, for example, includes a light guide plate 11, a reflective sheet 12, a first lens sheet 13, a second lens sheet 14, and a diffusion sheet 15. The reflective sheet 12 is disposed on a lower surface of the light guide plate 11, and reflects light leaked from the light guide plate 11 and allows the light to be incident on the light guide plate 11. The first lens sheet 13, the second lens sheet 14, and the diffusion sheet 15 are sequentially stacked on an upper surface of the light guide plate 11. The first lens sheet 13 and the second lens sheet 14 increase directivity of light emitted from the upper surface of the light guide plate 11. The diffusion sheet 15 appropriately diffuses the light whose directivity has been increased by the first lens sheet 13 and the second lens sheet 14. The reflective sheet 12, the first lens sheet 13, the second lens sheet 14, and the diffusion sheet 15 are disposed as necessary, and are not necessarily essential.

As illustrated in FIG. 2, the light source 20 is disposed in a side portion of the light guide body 10. The light source 20 allows light to be incident on the light guide body 10. A part of a side surface of the light guide body 10 is a light incident surface on which light from the light source 20 is incident. In the present embodiment, for example, a part of a first side surface 16 (refer to FIG. 3) corresponding to a long side of the light guide body 10 is the light incident surface. The light source 20 may have an arbitrary shape. The light source 20 may be configured of a plurality of point-like luminous bodies (a light emitting diode and the like), or may be configured of one linear luminous body (a cold-cathode tube and the like).

The light source 20 illustrated in FIG. 3, FIG. 5, and FIG. 6, for example, includes a plurality of luminous bodies 21, the power reception unit 51, and a light source mounting substrate 22. The luminous body 21 is a light emitting diode. The luminous bodies 21 are mounted on the light source mounting substrate 22. As illustrated in FIG. 3, FIG. 5, and FIG. 6, the power reception unit 51 is mounted on the surface of the light source mounting substrate 22 on a side opposite to the side on which the luminous bodies 21 are mounted. As illustrated in FIG. 3, the luminous bodies 21 are disposed to be adjacent to one another along a longitudinal direction of the first side surface 16. In FIG. 3, FIG. 5, and FIG. 6, the number of luminous bodies 21 is six, but the number of luminous bodies 21 is not limited thereto. In FIG. 6, the position of a power transmission unit 52 with respect to the power reception unit 51 is also illustrated.

As illustrated in FIG. 3, the light guide body 10 is attached to the inner frame 30 which is a first frame member. The inner frame 30 includes a first bottom plate 31 and a first frame body 32. The first bottom plate 31 supports a lower surface of the light guide body 10. The first frame body 32 protrudes from the first bottom plate 31 to the light guide body 10 side and surrounds the outer circumference of the light guide body 10. The light guide body 10 is housed in a first space 30A surrounded by the first frame body 32. The first space 30A is slightly larger than the light guide body 10.

The inner frame 30 is attached to the back cover 40 which is a second frame member. The back cover 40 includes a second bottom plate 41, the second frame body 42, and the light source holding unit 43. The second bottom plate 41 supports a lower surface of the inner frame 30. The second frame body 42 protrudes from the second bottom plate 41 to the inner frame 30 side and surrounds the outer circumference of the first frame body 32. The first frame body 32 is housed in a second space 40A surrounded by the second frame body 42. The second space 40A is slightly larger than the first frame body 32.

The light source holding unit 43 protrudes from the second bottom plate 41 to the inner frame 30 side, and is disposed outside the second space 40A. The light source holding unit 43 holds the light source 20 at a position facing the light incident surface of the light guide body 10.

The first frame body 32 includes the first side surface 16, a second side surface 17, a third side surface 18, and a fourth side surface 19. The second side surface 17 is a side surface facing the first side surface 16 (for example, a side surface corresponding to the long side of the light guide body 10). The third side surface 18 is a side surface different from the first side surface 16 and the second side surface 17 (for example, a side surface corresponding to a short side of the light guide body 10). The fourth side surface 19 is a side surface facing the third side surface 18 (for example, a side surface corresponding to the short side of the light guide body 10).

As illustrated in FIG. 3 and FIG. 4, the back cover 40 includes a penetrating portion 43n as a cutout formed by removing a part of the light source holding unit 43, and the power reception unit 51 of the light source mounting substrate 22 attached to the light source holding unit 43 is inserted into the penetrating portion 43n. Accordingly, it is possible to shorten a distance between the power reception unit 51 and the power transmission unit 52, and to increase the efficiency of wireless power transmission. The size of the penetrating portion 43n is larger than the area of the power reception unit 51. The cutout of the light source holding unit 43 is exemplified as the penetrating portion 43n, but the penetrating portion 43n may be a through hole of the light source holding unit 43.

As illustrated in FIG. 4 and FIG. 6, the power transmission unit 52 and a supply unit 54 are mounted on a power supply substrate 53. The power supply substrate 53, for example, is a rigid substrate such as a glass epoxy substrate.

The housing 300 includes a penetrating portion 300W that penetrates a part of a side plate. The penetrating portion 300W is positioned aside of the power reception unit 51. The power supply substrate 53 is fixed such that the power transmission unit 52 is inserted into the penetrating portion 300W. Accordingly, the power reception unit 51 and the power transmission unit 52 are disposed side by side to face each other. In the first embodiment, the power reception unit 51 faces the power transmission unit 52 with the side surface cover portion 62 of the front cover 60 interposed therebetween. A positional relationship between the power reception unit 51 and the power transmission unit 52 is not limited to this example. For example, the power transmission unit 52 may be disposed below the power reception unit 51 so as to face the power reception unit 51. As illustrated in FIG. 4, the light source mounting substrate 22 of the light source device 100 is not coupled to the power supply substrate 53 on the FPC board.

The side surface cover portion 62 of the front cover 60, not illustrated in FIG. 6, is disposed between the power reception unit 51 and the power transmission unit 52 illustrated in FIG. 4. When the side surface cover portion 62 of the front cover 60 is formed of a resin, there is a lower possibility of blocking electromagnetic induction, electromagnetic field resonance, or an electric wave between the power reception unit 51 and the power transmission unit 52. It is possible to shorten the distance between the power reception unit 51 and the power transmission unit 52 while ensuring sealability by the inner frame 30, the back cover 40, the front cover 60, and the housing 300. As a result, it is possible to prevent foreign substances from entering into the housing 300 while reducing loss in power transmission.

Figure 7:
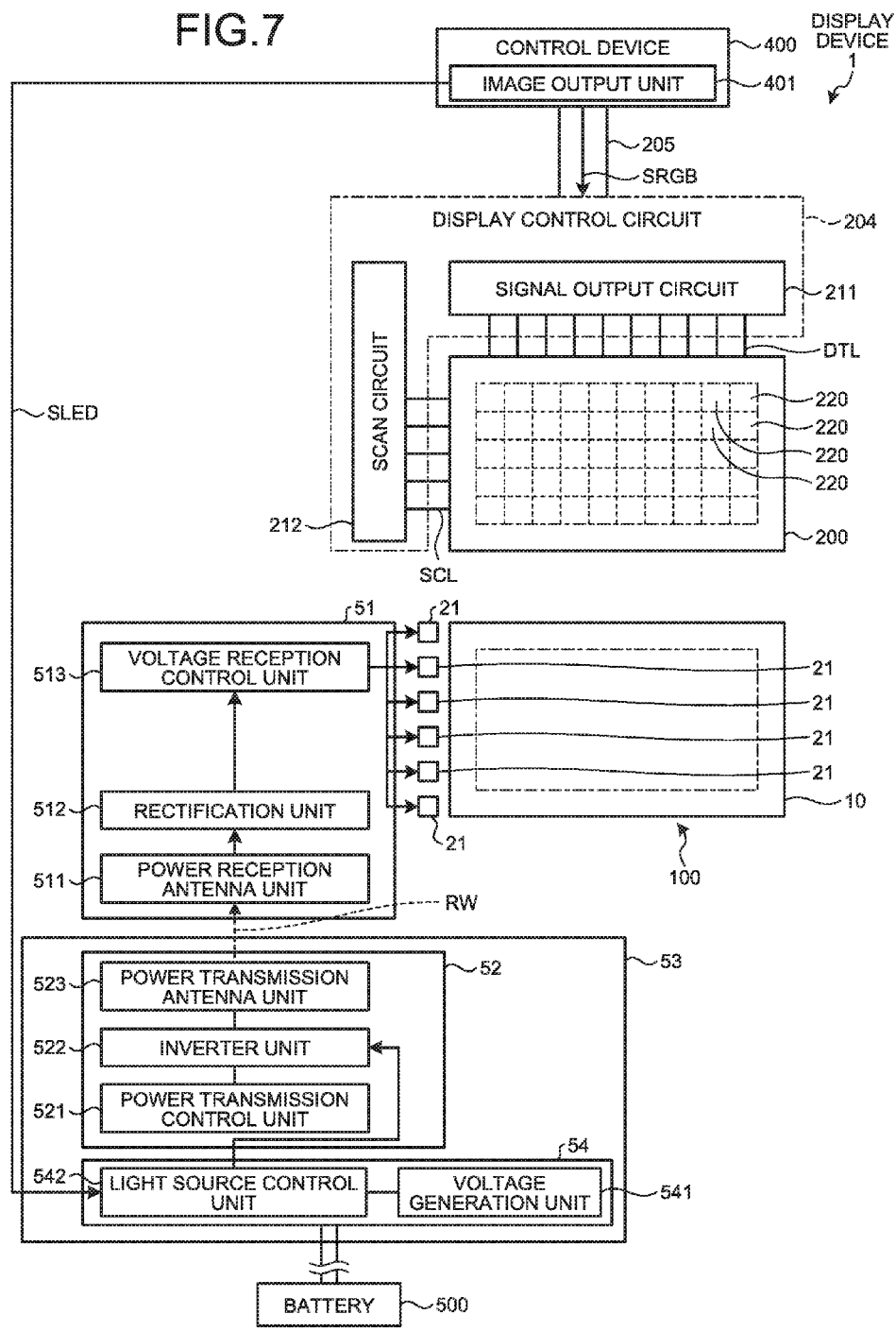
FIG. 7 is a block diagram of the display device according to the first embodiment.

FIG. 7 is a block diagram of the display device according to the first embodiment. As illustrated in FIG. 7, the display device 1 includes the display panel (the display unit) 200, the display control circuit 204, the light source device 100, the power reception unit 51, the power transmission unit 52, and the supply unit 54. The display panel (the display unit) 200 receives an input signal SRGB of an image from an image output unit 401 of a control device 400, and displays the image based on the input signal SRGB. The display control circuit 204 controls the drive of the display panel 200. The light source device 100 illuminates the display panel 200 from a back surface thereof. The power reception unit 51 controls the drive of the light source 20 of the light source device 100. The power transmission unit 52 wirelessly transmits power to the power reception unit 51. The supply unit 54 supplies power to the power transmission unit 52.

The control device 400 includes a microprocessor, mainly a central processing unit (CPU), a read only memory (ROM) which stores a processing program, a random access memory (RAM) which temporarily stores data, and a storage device serving as a storage unit. The control device 400 is an arithmetic processor which controls the operations of the display panel 200 and the light source device 100. The control device 400 is coupled to the display control circuit 204 for driving the display panel 200 on the FPC board 205. The control device 400 is electrically coupled to the supply unit 54 for driving the light source device 100. The control device 400 outputs the input signal SRGB to the display control circuit 204, and outputs a light source control signal SLED to the supply unit 54.

As illustrated in FIG. 7, in the display panel 200, pixels 220 are arranged in a two-dimensional matrix. The display control circuit 204 includes a signal output circuit 211 and a scan circuit 212. The signal output circuit 211 is electrically coupled to the display panel 200 by wiring DTL. The display control circuit 204 controls ON/OFF of a switching element (for example, TFT) for causing the scan circuit 212 to control the operations (light transmittance) of the pixels 220 in the display panel 200. The scan circuit 212 is electrically coupled to the display panel 200 by wiring SCL.

The supply unit 54 includes a voltage generation unit 541 and a light source control unit 542. The voltage generation unit 541 generates a predetermined voltage based on a reference voltage of power supplied from a battery 500. The voltage generation unit 541, for example, is a DC-DC converter using an inductor or a charge pump circuit using a capacitor and a switch.

The light source control unit 542 controls a drive voltage generated by the voltage generation unit 541, based on the information of the light source control signal SLED, and transmits the controlled drive voltage to the power transmission unit 52.

The power transmission unit 52 includes a power transmission control unit 521, an inverter unit 522, and a power transmission antenna unit 523. The power transmission control unit 521 controls the inverter unit 522 according to the drive voltage which is input to the inverter unit 522. The inverter unit 522, for example, is a resonance inverter circuit. The power transmission antenna unit 523 includes a coil for transmission, and generates an electromagnetic field RW by driving the inverter unit 522.

The power reception unit 51 includes a power reception antenna unit 511, a rectification unit 512, and a voltage reception control unit 513. The power reception antenna unit 511 includes a coil for reception, receives the electromagnetic field RW from the power transmission antenna unit 523, and converts the received electromagnetic field RW into a current. The rectification unit 512 rectifies the current which is received by the power reception unit 51. The voltage reception control unit 513 is a regulator circuit which regulates the voltage of the power rectified by the rectification unit 512 to a predetermined voltage. The voltage reception control unit 513 supplies the power to the luminous body 21, and thus the luminous body 21 emits light. As illustrated in FIG. 7, the power is supplied to the luminous bodies 21 from one power reception unit 51. The light source device 100 includes the luminous bodies 21 to which the power is supplied from one power reception unit 51.

Electric energy is transferred, by electromagnetic means, between the power transmission unit 52 and the power reception unit 51 which are not coupled to each other by a conductive body, so that wireless power transmission is performed. Any one of an electromagnetic induction method, an electromagnetic resonance method, an electric wave method, and the like is selected as a coupling method for the wireless power transmission between the power transmission unit 52 and the power reception unit 51. For example, the power is transmitted between the power transmission unit 52 and the power reception unit 51 using wireless power transmission of the electromagnetic induction method, by which electromotive force is generated in a second coil adjacent to a first coil through a magnetic flux generated when a current flows in the first coil. Alternatively, the power is transmitted between the power transmission unit 52 and the power reception unit 51 using wireless transmission of the electromagnetic field resonance method, which utilizes a resonance phenomenon of an electromagnetic field. Alternatively, the power is transmitted between the power transmission unit 52 and the power reception unit 51 using wireless power transmission of the electric wave method, the technology by which power is converted into an electromagnetic wave and is transmitted and received through an antenna. As illustrated in FIG. 4, the light source device 100 and the power supply substrate 53 are not coupled to each other on the FPC board, which prevents the disconnection of power wiring due to vibration. When the housing 300 described above is a metal body, it is possible to reduce unexpected noise due to the wireless power transmission.

The power transmission unit 52 transmits the electromagnetic field RW according to transmission power based on the information of the light source control signal SLED, and the power reception unit 51 drives the luminous body 21 by the power according to the electromagnetic field RW. Thus, the luminous body 21 emits light in the amount of luminescence according to the transmission power which is transmitted by the power transmission unit 52.

The display device 1 of the present embodiment described above includes the display panel 200, the light source device 100 which includes the luminous bodies 21, the power reception unit 51 which receives the power of the light source device 100, and the power transmission unit 52 which wirelessly transmits the power to the power reception unit 51. For this reason, an FPC board or the like, for supplying the power to the luminous body 21 is not necessary. It is not necessary to dispose an extraction port (a gap, a hole, and the like) of the back cover 40 or the front cover 60 provided around the light guide body 10, which is necessary for the FPC board to supply the power to the luminous body 21. As a result, leakage of light caused by the extraction port is prevented. There is a lower possibility that the disconnection occurs in the FPC board for supplying the power to the luminous body 21 due to vibration or the like. Even when the display device 1 is mounted on a movable object such as a vehicle, absence of the FPC board for supplying the power to the luminous body 21 lowers the possibility of a failure.

When the wireless power transmission is performed between the power transmission unit 52 and the power reception unit 51, a variation in an output voltage which is output to the luminous body 21 is in a range of 0% to 3%. The distance between the power transmission unit 52 and the power reception unit 51 can be accurate and fixed to be constant. The variation in the output voltage is sufficiently smaller than a voltage variation (for example, a voltage variation of 10%) which is allowed by the luminous body 21 itself. A variation in an output voltage which is allowed by the display control circuit 204 can be less than or equal to one third of the variation in the output voltage which is allowed by the luminous body 21. In the display device 1 of the present embodiment, the supply of the power to the light source 20 (the luminous body 21) is performed by the wireless power transmission, aside from the supply of the power to the display control circuit 204, thereby reducing an influence on the control of the display panel 200.

The display device 1 of the present embodiment includes the light source device 100 including the luminous body 21 to which the power is supplied from the power reception unit 51, the housing 300 in which the light source device 100 and the display panel 200 are housed, and the power supply substrate 53 which is disposed outside the housing 300 and on which the power transmission unit 52 is mounted. According to this configuration, the light source device 100 is covered with the housing 300, and thus the sealability is improved. The light source 20 is disposed in a space surrounded by the back cover 40, the front cover 60, and the light guide body 10, and thus is configured that the power reception unit 51 is not exposed to the outside. This configuration reduces the influence by foreign substances on the light source device 100.

First Modification of First Embodiment

Figure 8:
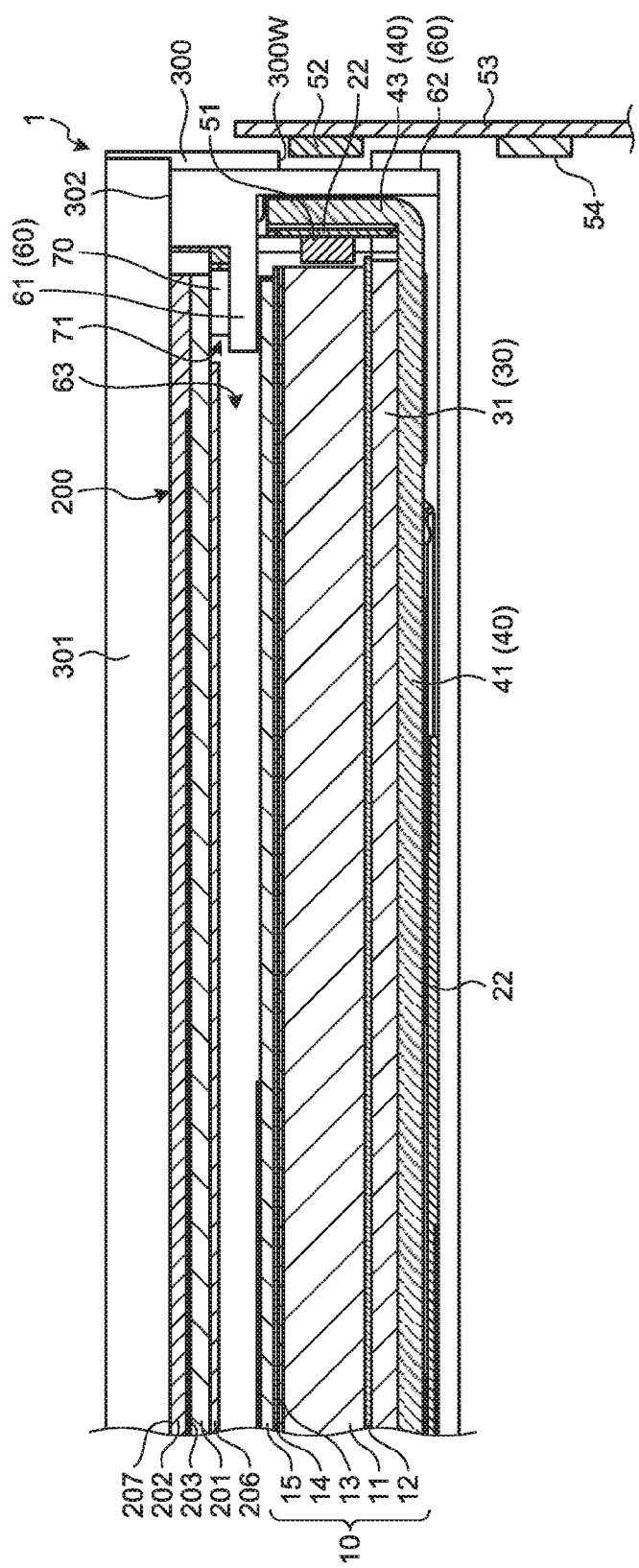
FIG. 8 is a sectional view of a display device according to a first modification of the first embodiment.
Figure 9:
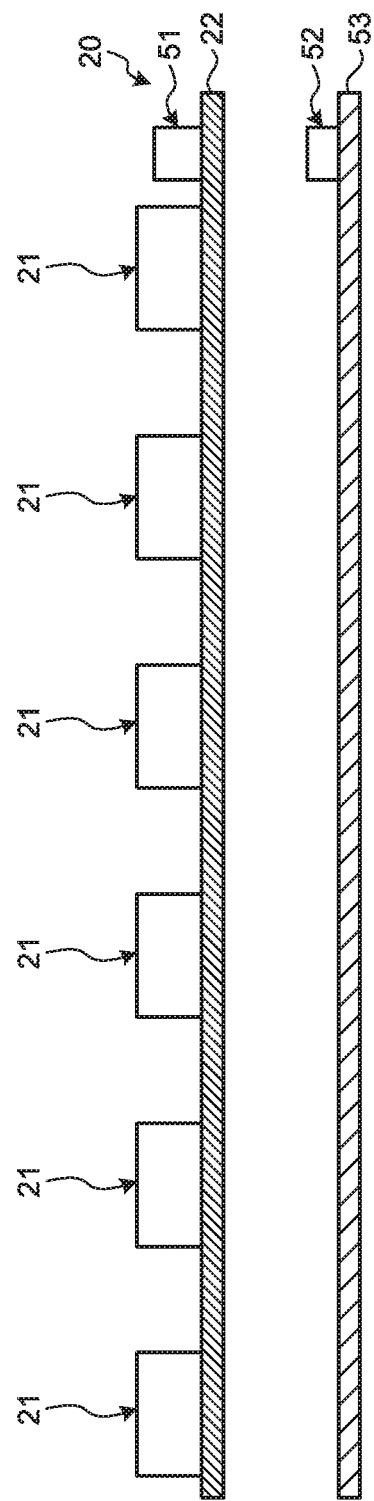
FIG. 9 is a sectional view of a light source of the display device according to the first modification of the first embodiment.

FIG. 8 is a sectional view of a display device according to a first modification of the first embodiment. FIG. 9 is a sectional view of a light source of the display device according to the first modification of the first embodiment. As illustrated in FIG. 8 and FIG. 9, the power reception unit 51 is mounted on a surface of the light source mounting substrate 22, the surface being the same as that on which the luminous bodies 21 are mounted. In FIG. 9, the position of the power transmission unit 52 with respect to the power reception unit 51 is also illustrated.

The display device according to the first modification illustrated in FIG. 8 does not include the penetrating portion 43n (refer to FIG. 4) in the light source holding unit 43. The side surface cover portion 62 of the front cover 60 and the light source holding unit 43 of the back cover 40, which are not illustrated in FIG. 9, are disposed between the power reception unit 51 and the power transmission unit 52 illustrated in FIG. 8. Thus, in the first modification of the first embodiment, the power reception unit 51 faces the power transmission unit 52 with the side surface cover portion 62 of the front cover 60 and the light source holding unit 43 of the back cover 40 interposed therebetween. When the side surface cover portion 62 of the front cover 60 and the light source holding unit 43 of the back cover 40 illustrated in FIG. 8 are formed of a resin, there is a lower possibility of blocking electromagnetic induction, electromagnetic field resonance, or an electric wave between the power reception unit 51 and the power transmission unit 52.

Second Modification of First Embodiment

Figure 10:
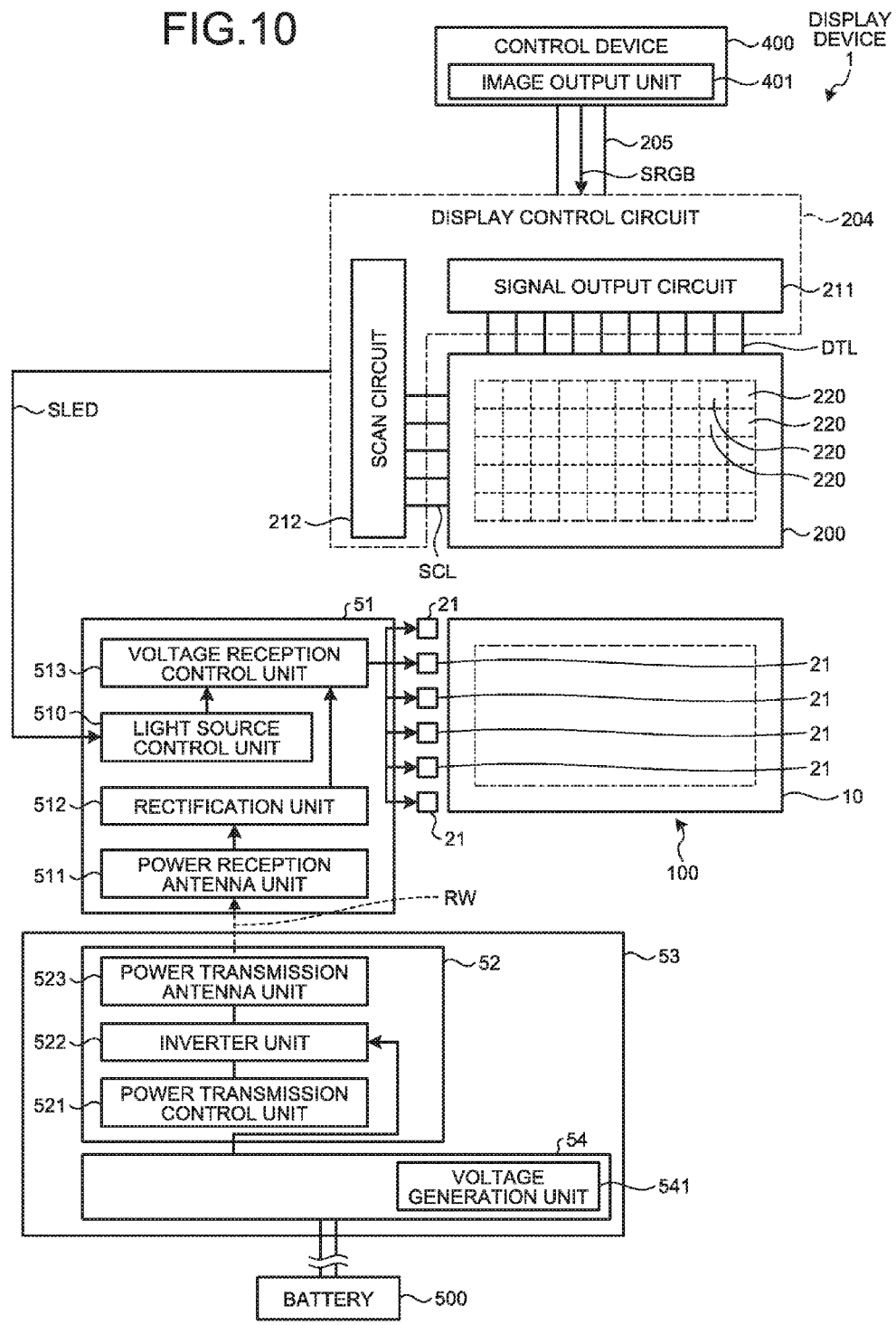
FIG. 10 is a block diagram of a display device according to a second modification of the first embodiment.

FIG. 10 is a block diagram of a display device according to a second modification of the first embodiment. In the display device 1 of the first embodiment, the supply unit 54 includes the light source control unit 542. In the display device 1 according to the second modification of the first embodiment, the power reception unit 51 includes a light source control unit 510. The light source control unit 510 controls the amount of power which is supplied to the luminous body 21 by the voltage reception control unit 513 based on the information of the light source control signal SLED. In the second modification of the first embodiment, the light source control signal SLED is supplied to the light source control unit 510 from the display control circuit 204.

The power transmission unit 52 transmits the electromagnetic field RW which becomes predetermined transmission power, and the power reception unit 51 controls the power according to the electromagnetic field RW based on the information of the light source control signal SLED to drive the luminous body 21. Thus, even when the transmission power which is transmitted by the power transmission unit 52 is set to be constant, the amount of luminescence of the luminous body 21 can be controlled.

Second Embodiment

Figure 11:
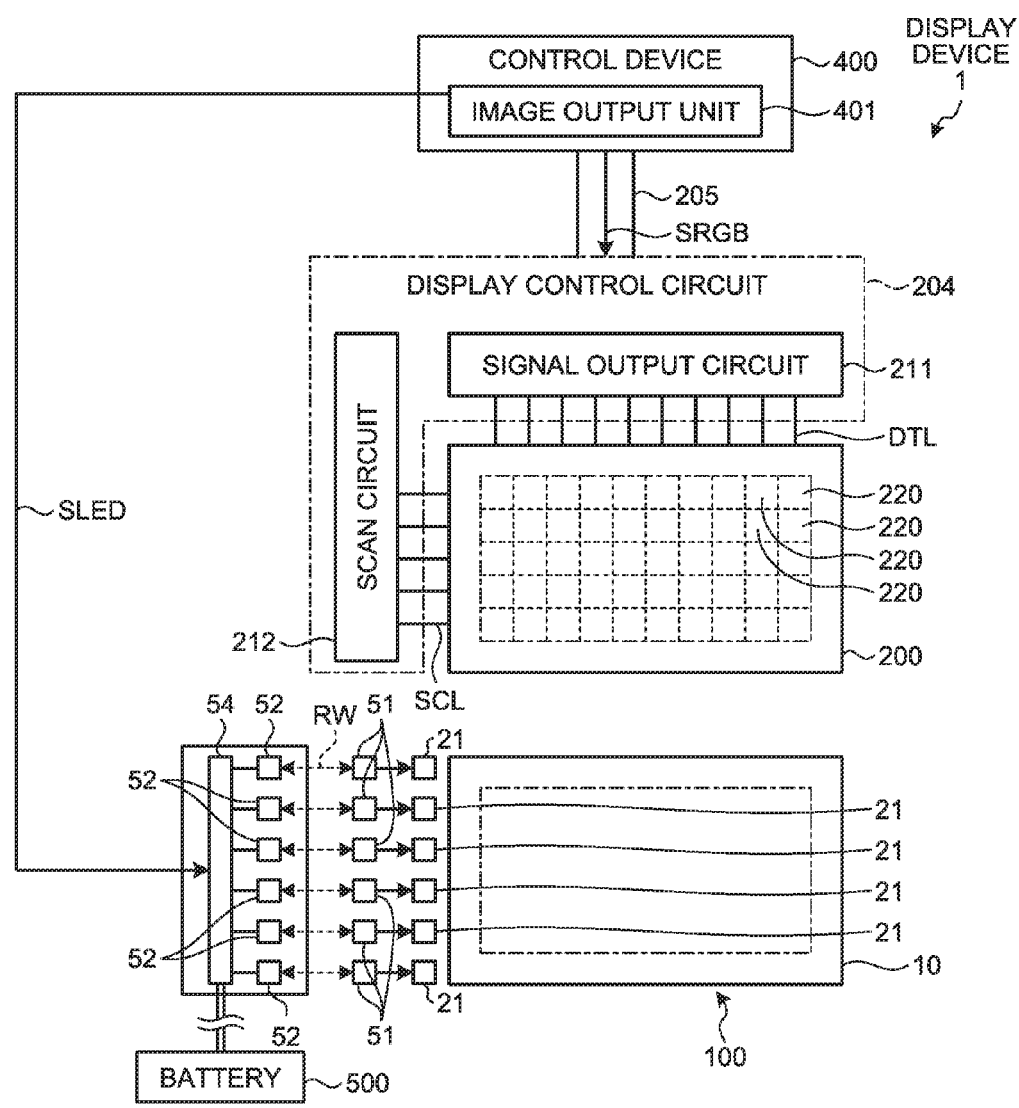
FIG. 11 is a block diagram of a display device according to a second embodiment of the present invention.

FIG. 11 is a block diagram of a display device according to a second embodiment. In this embodiment, the same reference numerals are applied to the same components as those of the first embodiment, and the detailed description thereof will be omitted.

The power reception unit 51 of the first embodiment supplies power to the luminous bodies 21. In the second embodiment, one power reception unit 51 supplies power to one luminous body 21. That is, the light source device 100 includes a plurality of individual luminous bodies 21, to each of which the power is supplied from the one power reception unit 51 on a one-on-one basis.

For this reason, a pair of the power reception unit 51 and the power transmission unit 52 is coupled to each other through the electromagnetic field RW by the coupling method of the wireless power transmission described above. Therefore, it is preferable that the wireless power transmission is performed by the predetermined pair of the power reception unit 51 and the power transmission unit 52, which reduces the influence of the wireless power transmission on another pair of the power reception unit 51 and the power transmission unit 52 which is adjacent to the pair of the power reception unit 51 and the power transmission unit 52, for example.

For example, a resonance frequency wirelessly transmitted by a first set of the power reception unit 51 and the power transmission unit 52 is different from a resonance frequency wirelessly transmitted by a second set of the power reception unit 51 and the power transmission unit 52 which is adjacent to the first set. This configuration improves the efficiency of the wireless power transmission in each pair of the power reception unit 51 and the power transmission unit 52. As a result, the power transmission unit 52 is capable of transmitting different transmission power to each of the power reception units 51 such that each of the luminous bodies 21 has a different amount of luminescence. Then, each of the luminous bodies 21 is controlled by a different amount of luminescence, which reduces power consumption, and allows the light source device 100 to emit light with an optimum luminance for each of divided areas of the display panel 200, the divided areas being obtained by dividing the display panel 200.

Third Embodiment

Figure 12:
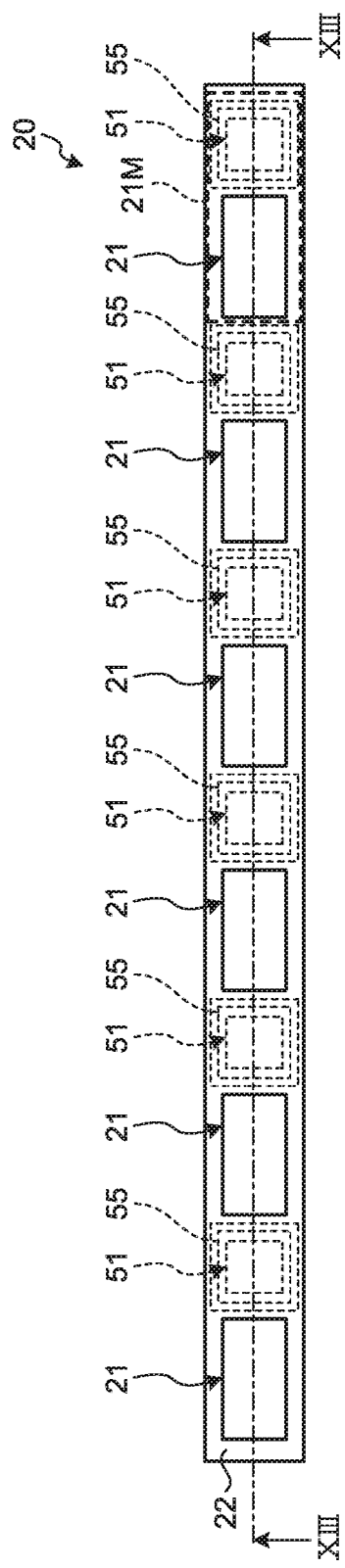
FIG. 12 is a plan view of a light source of a display device according to a third embodiment of the present invention.
Figure 13:
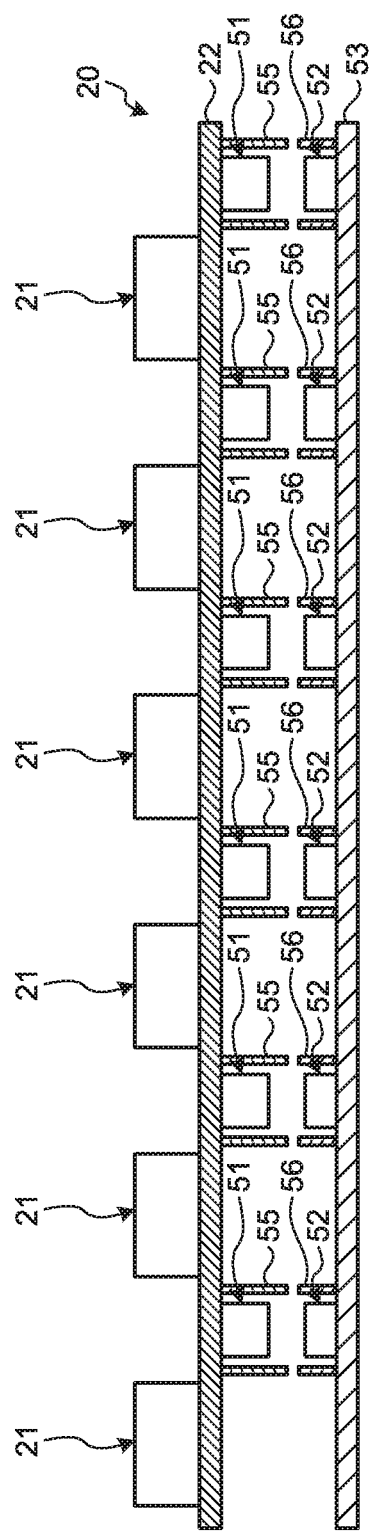
FIG. 13 is a sectional view illustrating a cross-section taken along line XIII-XIII in FIG. 12.

FIG. 12 is a plan view of a light source of a display device according to a third embodiment. FIG. 13 is a sectional view illustrating a cross-section taken along line XIII-XIII in FIG. 12. The display device 1 according to the third embodiment has the same configuration as that in the block diagram of the display device 1 according to the second embodiment illustrated in FIG. 11. In the present embodiment, the same reference numerals are applied to the same components as those of either the first embodiment or the second embodiment, and the detailed description thereof will be omitted.

As illustrated in FIG. 12 and FIG. 13, the light source 20 according to the third embodiment, for example, includes the luminous bodies 21, the power reception unit 51, the light source mounting substrate 22, and a shield portion 55. A disposition region 21M indicates a range in which a pair of the luminous body 21 and the power reception unit 51 is disposed. The shield portion 55 is a metallic frame body having a size to surround the power reception unit 51 in the plan view. The shield portion 55 may be a metallic frame body having a size to surround the entire disposition region 21M in the plan view. The power reception unit 51 and the power transmission unit 52 are disposed to face each other. The shield portion 55 has an opening on the power transmission unit 52 side.

In FIG. 13, the position of the power transmission unit 52 with respect to the power reception unit 51 is also illustrated. As illustrated in FIG. 13, the power transmission unit 52 and a shield portion 56 are mounted on the power supply substrate 53 according to the third embodiment. The shield portion 56 is a metallic frame body having a size to surround the power transmission unit 52 in the plan view. The shield portion 56 has an opening on the power reception unit 51 side. When the shield portion 55 is a metallic frame body having a size to surround the entire disposition region 21M in the plan view, it is preferable that the shield portion 56 is also a metallic frame body having a size to surround the entire disposition region 21M in the plan view.

Also in the display device 1 according to the third embodiment, the power transmission unit 52 is capable of transmitting different transmission power to each of the power reception units 51. Then, each of the luminous bodies 21 is controlled by a different amount of luminescence, which reduces power consumption, and allows the light source device 100 to emit light with an optimum luminance for each of divided areas of the display panel 200, the divided areas being obtained by dividing the display panel 200.

In the third embodiment, the shield portion 55 and the shield portion 56 are exemplified, but only one of the shield portion 55 and the shield portion 56 may be disposed.

Modification of Third Embodiment

Figure 14:
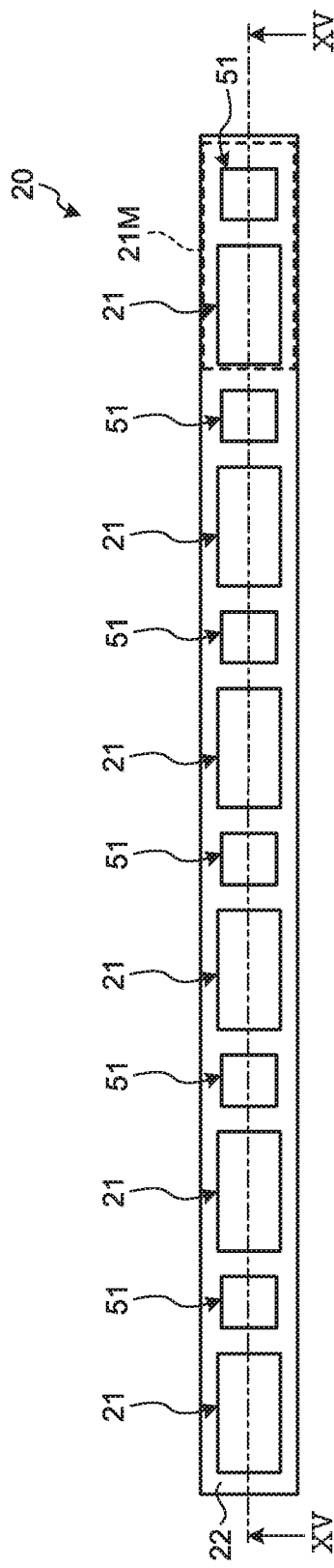
FIG. 14 is a plan view of a light source of a display device according to a modification of the third embodiment.
Figure 15:
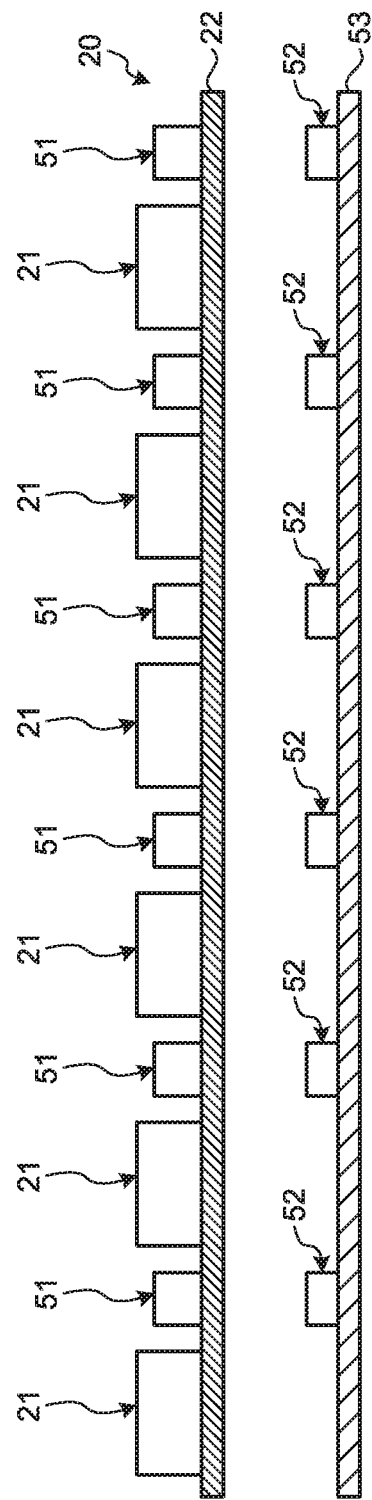
FIG. 15 is a sectional view illustrating a cross-section taken along line XV-XV in FIG. 14.

FIG. 14 is a plan view of a light source of a display device according to a modification of the third embodiment. FIG. 15 is a sectional view illustrating a cross-section taken along line XV-XV in FIG. 14. In FIG. 15, the position of the power transmission unit 52 with respect to the power receiving unit 51 is also illustrated. The display device 1 according to the modification of the third embodiment has the same configuration as that in the block diagram of the display device 1 according to the second embodiment illustrated in FIG. 11. In the present embodiment, the same reference numerals are applied to the same components as those of any one of the first embodiment to the third embodiment, and the detailed description thereof will be omitted.

As illustrated in FIG. 14 and FIG. 15, the power receiving unit 51 is mounted on the surface of the light source mounting substrate 22 on the same side as that of the mounting surface of the luminous bodies 21. In the modification of the third embodiment, the shield portion 55 and the shield portion 56 are not disposed.

According to the shield portion 55 and the shield portion 56, it is possible to prevent interference between an electromagnetic wave wirelessly transmitted by the first set of the power receiving unit 51 and the power transmission unit 52, and an electromagnetic wave wirelessly transmitted by the second set of the power receiving unit 51 and the power transmission unit 52 which is adjacent to the first set. Accordingly, in each pair of the power receiving unit 51 and the power transmission unit 52, the efficiency of the wireless power transmission increases. As a result, the power transmission unit 52 is capable of transmitting different transmission power to each of the power receiving units 51 such that each of the luminous bodies 21 has a different amount of luminescence. Then, each of the luminous bodies 21 is controlled by a different amount of luminescence, which reduces power consumption, and allows the light source device 100 to emit light with an optimum luminance for each of divided areas of the display panel 200, the divided areas being obtained by dividing the display panel 200.

Similarly to FIG. 4, even in the display device according to the modification of the third embodiment, the side surface cover portion 62 of the front cover 60 is disposed between the power receiving unit 51 and the power transmission unit 52. When the side surface cover portion 62 of the front cover 60 is formed of a resin, there is a lower possibility of blocking electromagnetic induction, electromagnetic field resonance, or an electric wave between the power receiving unit 51 and the power transmission unit 52. It is possible to shorten the distance between the power receiving unit 51 and the power transmission unit 52 while ensuring sealability by the inner frame 30, the back cover 40, the front cover 60, and the housing 300. As a result, it is possible to prevent foreign substances from entering into the housing 300 while reducing loss in power transmission.

Fourth Embodiment

Figure 16:
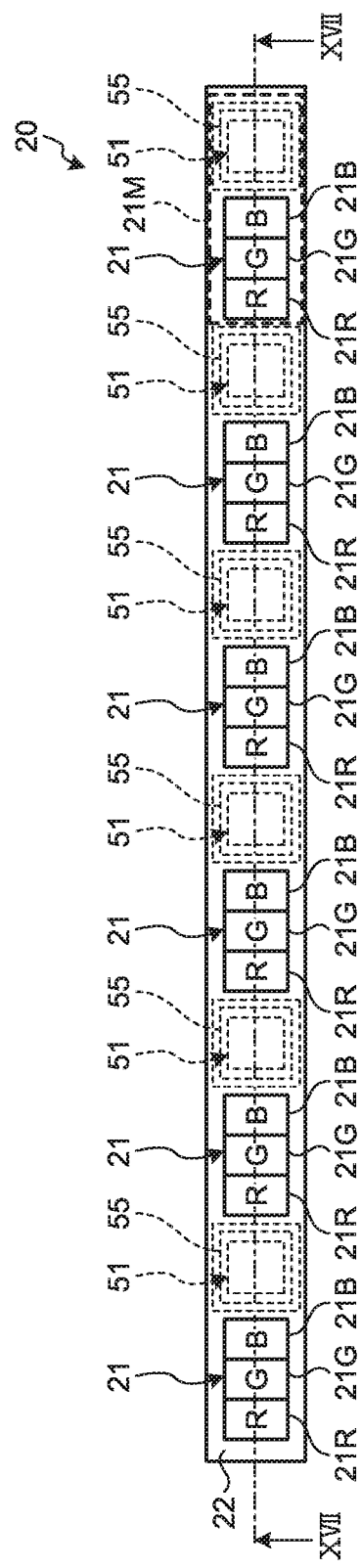
FIG. 16 is a plan view of a light source of a display device according to a fourth embodiment of the present invention.
Figure 17:
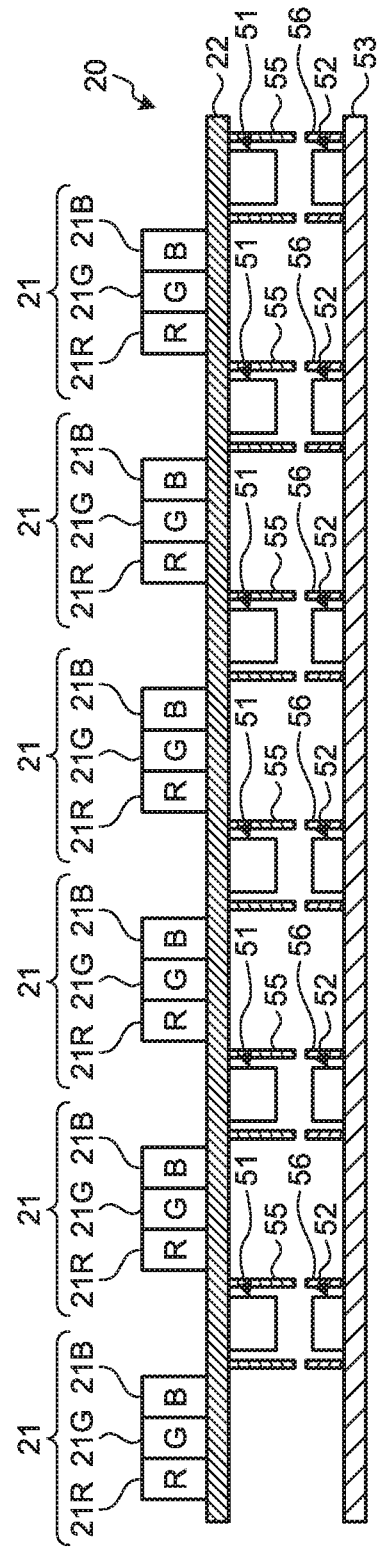
FIG. 17 is a sectional view illustrating a cross-section taken along line XVII-XVII in FIG. 16.
Figure 18:
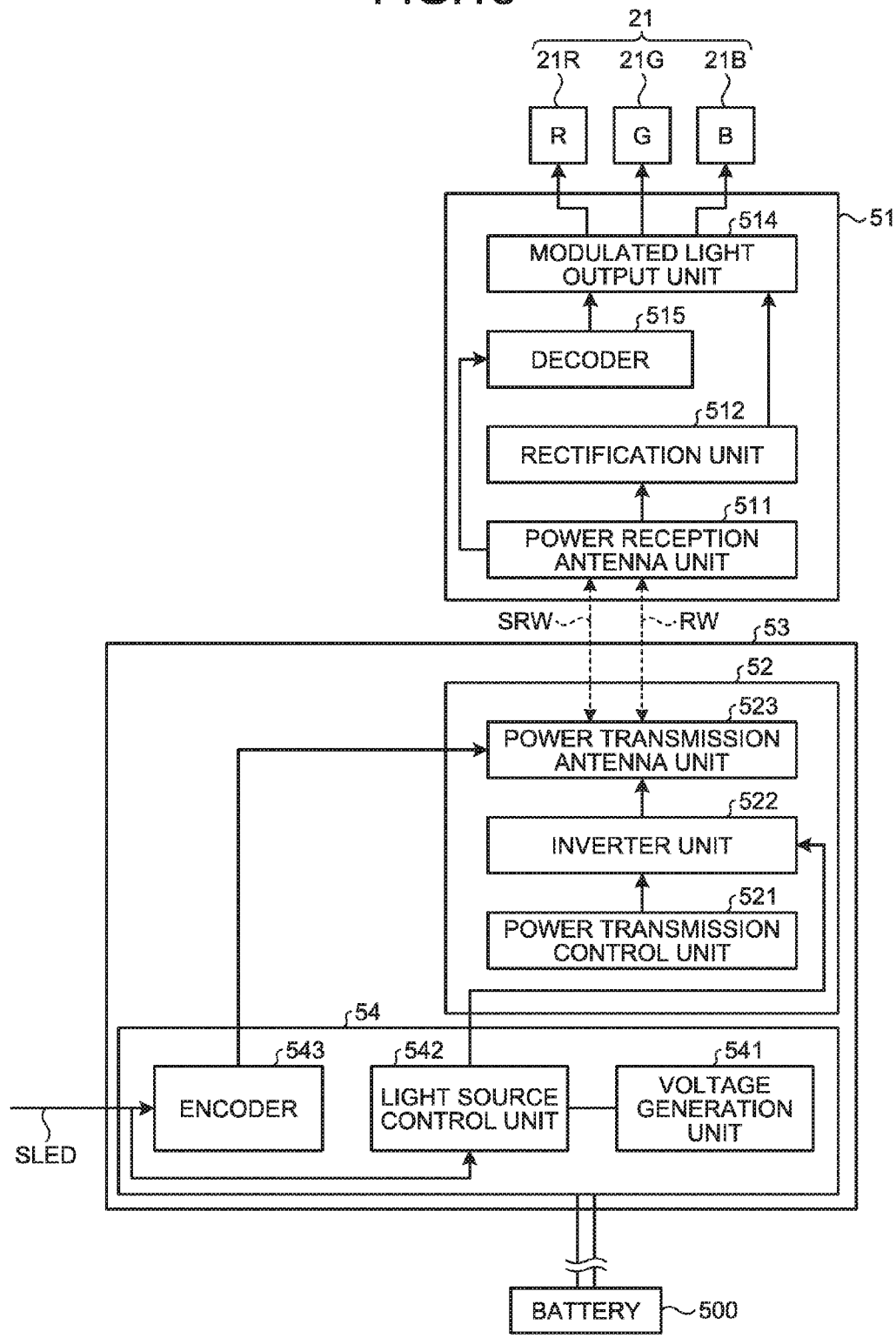
FIG. 18 is a block diagram of the display device according to the fourth embodiment.

FIG. 16 is a plan view of a light source of a display device according to a fourth embodiment. FIG. 17 is a sectional view illustrating a cross-section taken along line XVII-XVII in FIG. 16. In FIG. 17, the position of the power transmission unit 52 with respect to the power receiving unit 51 is also illustrated. FIG. 18 is a block diagram of the display device according to the fourth embodiment. In the present embodiment, the same reference numerals are applied to the same components as those of any one of the first embodiment to the third embodiment, and the detailed description thereof will be omitted.

As illustrated in FIG. 16 and FIG. 17, the light source 20 according to the fourth embodiment includes, for example, the luminous bodies 21, the power receiving unit 51, the light source mounting substrate 22, and the shield portion 55. The disposition region 21M indicates a range in which a pair of the luminous body 21 and the power receiving unit 51 is disposed. The luminous body 21 includes a luminous body 21R of a first color, a luminous body 21G of a second color, and a luminous body 21B of a third color. The luminous body 21R of the first color, for example, is capable of emitting red light. The luminous body 21G of the second color, for example, is capable of emitting green light. The luminous body 21B of the third color, for example, is capable of emitting blue light.

The display device 1 according to the fourth embodiment has the same configuration as that in the block diagram of the display device 1 according to the second embodiment illustrated in FIG. 11. The display device 1 according to the fourth embodiment includes the luminous body 21R of the first color, the luminous body 21G of the second color, and the luminous body 21B of the third color, and is driven by a so-called field sequential method. During the first given time, the luminous body 21R of the first color emits light, and the pixel 220 displaying only the first color (for example, red) transmits the light and displays the first color. At this time, only the first color is lit on the entire display panel 200. During the next given time, the luminous body 21G of the second color emits light, the pixel 220 displaying only the second color (for example, green) transmits the light and displays the second color. At this time, only the second color is lit on the entire display panel 200. During another given time, the luminous body 21B of the third color emits light, and the pixel 220 displaying only the third color (for example, blue) transmits the light and displays the third color. At this time, only the third color is lit on the entire display panel 200. The temporal resolution of the human eyes is limited and persistence of vision is caused, so that a synthesized image of three colors is recognized by the human eyes. The field sequential method does not require a color filter, and reduces an absorption loss in the color filter, thereby realizing high transmittance. In a color filter method, one pixel is formed of subpixels that are obtained by dividing the pixel 220 into the first color, the second color, and the third color, whereas the field sequential method does not require such division into subpixels, which makes it easy to increase resolution.

Here, the configuration of the luminous body 21 according to the present embodiment is different from that according to any of the above-described embodiments, and thus the configuration of the power receiving unit 51, the power transmission unit 52, and the supply unit 54 will be described in more detail with reference to FIG. 18. As illustrated in FIG. 18, the supply unit 54 includes the voltage generation unit 541, the light source control unit 542, and an encoder 543. The power unit 51 includes the power reception antenna unit 511, the rectification unit 512, a modulated light output unit 514, and a decoder 515. The encoder 543 converts color information of the first color, color information of the second color, and color information of the third color into a signal which can be transmitted by the power transmission antenna unit 523, based on the information of the light source control signal SLED. The power transmission antenna unit 523 includes the coil for transmission, generates the electromagnetic field RW by driving the inverter unit 522, and generates a signal electromagnetic field SRW on which the color information of the first color, the color information of the second color, and the color information of the third color are superimposed.

The power reception antenna unit 511 includes the coil for reception, receives the electromagnetic field RW from the power transmission antenna unit 523, and converts the received electromagnetic field RW to a current. When the power reception antenna unit 511 receives the signal electromagnetic field SRW from the power transmission antenna unit 523, the decoder 515 decodes the color information of the first color, the color information of the second color, and the color information of the third color. The modulated light output unit 514 changes the voltage of the power which is rectified by the rectification unit 512 based on the decoded color information of the first color, the decoded color information of the second color, and the decoded color information of the third color, and controls light emitting time and light emission intensity of each of the luminous body 21R of the first color, the luminous body 21G of the second color, and the luminous body 21B of the third color.

According to this configuration, the power is wirelessly transmitted to the light source device 100, and the luminous bodies 21R, 21G, and 21B are wirelessly driven at a high speed. Normally, increase in resolution increases the number of luminous bodies 21R, 21G, and 21B, and thus increases the number of wiring lines routed to the outside. However, according to the display device 1 of the fourth embodiment, the luminous bodies 21R, 21G, and 21B are wirelessly driven at a high speed, which can reduce the number of wiring lines. There is a lower possibility of leading to lighting failure (power supply failure) of the light source device 100 due to the disconnection caused by the vibration. The display panel 200 can implement color display without color filter.

A configuration may be employed in which the power reception units 51 are respectively provided for the luminous body 21R of the first color, the luminous body 21G of the second color, and the luminous body 21B of the third color, and the respective power reception units 51 individually supply power to the luminous body 21R of the first color, the luminous body 21G of the second color, and the luminous body 21B of the third color.

Fifth Embodiment

Figure 19:
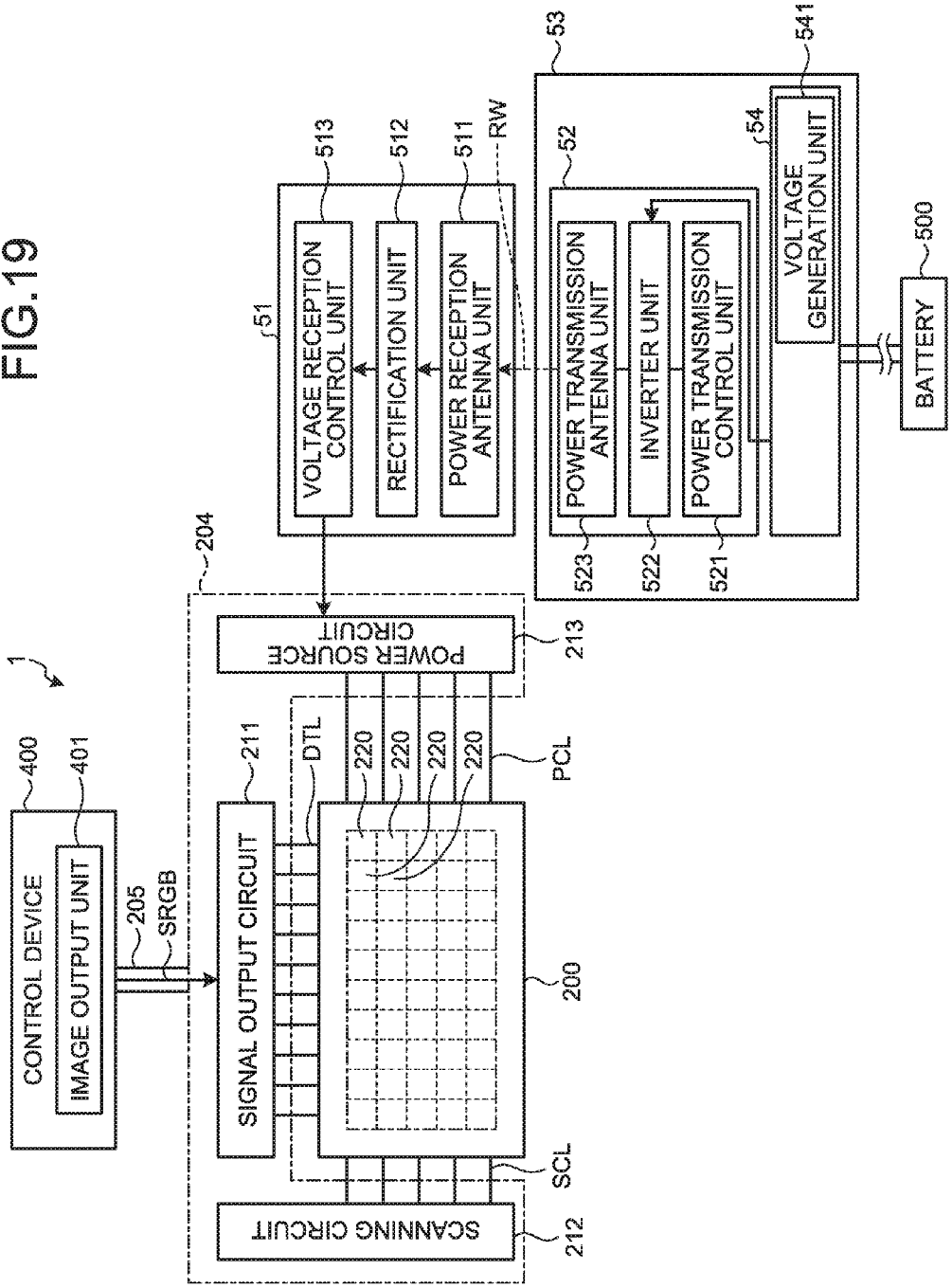
FIG. 19 is a block diagram of a display device according to a fifth embodiment of the present invention.
Figure 20:
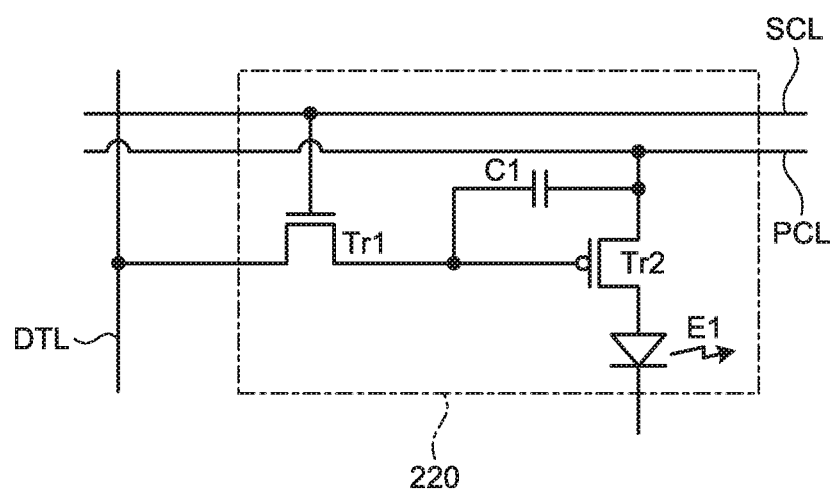
FIG. 20 is a circuit diagram illustrating a pixel of the display device according to the fifth embodiment.

FIG. 19 is a block diagram of a display device according to a fifth embodiment. FIG. 20 is a circuit diagram illustrating a pixel of the display device according to the fifth embodiment. In this embodiment, the same reference numerals are applied to the same components as those of any one of the first embodiment to the fourth embodiment, and the detailed description thereof will be omitted.

In the fifth embodiment, the display panel 200 lights a self-luminous body such as a so-called organic light emitting diode (OLED). A power source circuit 213 supplies power to an organic light emitting diode E1, which is the self-luminous body of each of the pixels 220, by a power source line PCL.

As illustrated in FIG. 20, the pixel 220 includes a plurality of subpixels, and lighting drive circuits of the subpixels illustrated in FIG. 20 are arranged in a two-dimensional matrix. The lighting drive circuit includes a control transistor Tr1, a drive transistor Tr2, and a charge holding capacitor C1. The gate of the control transistor Tr1 is coupled to wiring SCL, the source is coupled to wiring DTL, and the drain is coupled to the gate of the drive transistor Tr2. One end of the charge holding capacitor C1 is coupled to the gate of the drive transistor Tr2, and the other end thereof is coupled to the source of the drive transistor Tr2. The source of the drive transistor Tr2 is coupled to the power source line PCL, and the drain of the drive transistor Tr2 is coupled to the anode of the organic light emitting diode E1 which is the self-luminous body. The cathode of the organic light emitting diode E1, for example, is coupled to a reference potential (for example, the ground).

In the present embodiment, the power reception unit 51 supplies the power to the power source circuit 213. Thus, the organic light emitting diode E1, which is the self-luminous body of the display panel 200, emits light by the power for emitting light to the observer side from the display panel 200, the power being supplied by the power reception unit 51. For this reason, the FPC board for supplying the power to the power source circuit 213 or the like is not required. Even when the display device 1 is mounted on a movable object such as a vehicle, absence of the FPC board for supplying the power to the luminous body 21 lowers the possibility of a failure.

As described above, preferred embodiments of the present invention have been described, but the present invention is not limited to such embodiments. The contents disclosed in the embodiments are merely an example, and various modifications can be performed within a scope not departing from the purpose of the present invention. The appropriate modifications made within the scope not departing from the purpose of the present invention naturally fall within the technical scope of the present invention.

For example, in the first embodiment, the housing 300 is formed of metal, but the material is not limited thereto. The base material of the housing 300 may be a resin, a mesh-like metal may be disposed outside of the housing 300, but not disposed at a position where the power reception unit 51 and the power transmission unit 52 face each other.

In the fourth embodiment, the luminous bodies of three colors, i.e., red, green, and blue are exemplified as the luminous bodies 21, but the luminous bodies 21 are not limited thereto. The present invention can be applied to the luminous bodes 21 of cyan, magenta, and yellow. The luminous bodies 21 may include the luminous body 21R of the first color, the luminous body 21G of the second color, the luminous body 21B of the third color, and further include a luminous body of a fourth color.

The configurations disclosed in the first embodiment to the fifth embodiment are merely examples, the configurations can be appropriately combined, or can be appropriately modified within the scope not departing from the purpose of the present invention.

In the respective embodiments described above, the respective components can be appropriately combined. The present invention can naturally provide other advantageous effects that are provided by the aspects described in the embodiments above and are clearly defined by the description in the present specification or appropriately conceivable by those skilled in the art.

What is claimed is:
1. A display device comprising:
a display unit;

a light source device that irradiates the display unit with light;
at least one power reception unit that receives power for the light source device;
at least one power transmission unit that wirelessly transmits power to the at least one power reception unit;
a housing that houses the light source device and the display unit; and
a power supply substrate that is disposed outside the housing and on which the at least one power transmission unit is mounted, wherein
the light source device includes a plurality of luminous bodies to which power is supplied from one power reception unit,
the light source device includes a light guide body, a front cover and a back cover interposing the light guide body therebetween, and a light source mounting substrate on which the luminous bodies are mounted,
the back cover includes a light source holding unit disposed on a side surface of the back cover,
the front cover is made of a resin, and includes a side surface cover portion disposed along an outside surface of the light source holding unit,
the light source mounting substrate and the at least one power reception unit are positioned closer to the light guide body side than the front cover,
the at least one power reception unit is inserted into a first penetrating portion that penetrates a part of the back cover, and
the at least one power reception unit faces the at least one power transmission unit with the resin front cover interposed therebetween, and the side surface cover portion covers the first penetrating portion.

2. The display device according to claim 1, wherein the light source device and the power supply substrate are not coupled to each other on a flexible substrate.

3. The display device according to claim 1, wherein each of the luminous bodies emits light in an amount of luminescence according to transmission power transmitted from the at least one power transmission unit.

4. The display device according to claim 1, further comprising:
a shield portion that surrounds the at least one power reception unit.

5. The display device according to claim 1, wherein the luminous bodies include at least a luminous body of a first color, a luminous body of a second color, and a luminous body of a third color, and are driven by a field sequential method.

6. A display device comprising:
a display unit;
a light source device that irradiates the display unit with light;
at least one power reception unit that receives power for the light source device;
at least one power transmission unit that wirelessly transmits power to the at least one power reception unit;
a housing that houses the light source device and the display unit; and
a power supply substrate that is disposed outside the housing and on which the power transmission unit is mounted, wherein
the light source device includes a plurality of luminous bodies to which power is supplied from the respective power reception units on a one-on-one basis,
the light source device includes a light guide body, a front cover and a back cover interposing the light guide body therebetween, and a light source mounting substrate on which the luminous bodies are mounted,
the back cover includes a light source holding unit disposed on a side surface of the back cover,
the front cover is made of a resin, and includes a side surface cover portion disposed along an outside surface of the light source holding unit,
the light source mounting substrate and the at least one power reception unit are positioned closer to the light guide body side than the front cover,
the at least one power reception unit is inserted into a first penetrating portion that penetrates a part of the back cover, and
the at least one power reception unit faces the at least one power transmission unit with the resin front cover interposed therebetween.

7. The display device according to claim 6, wherein the light source device and the power supply substrate are not coupled to each other on a flexible substrate.

* * * * *